(12) United States Patent
Thanu et al.

(10) Patent No.: US 7,653,637 B2
(45) Date of Patent: Jan. 26, 2010

(54) INDIRECT PERSISTENT STORAGE FOR PLUGIN IN CONTAINER

(75) Inventors: Lakshmi Narayanan Thanu, Sammamish, WA (US); Peter Eberhardy, Seattle, WA (US); Vijay Govind Baliga, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 234 days.

(21) Appl. No.: 10/970,791

(22) Filed: Oct. 20, 2004

(65) Prior Publication Data

US 2006/0085446 A1  Apr. 20, 2006

(51) Int. Cl.
G06F 7/00 (2006.01)
G06F 17/00 (2006.01)
G06F 17/30 (2006.01)

(52) U.S. Cl. ........................... 707/100; 709/215
(58) Field of Classification Search .............. None
See application file for complete search history.

(56) References Cited

U.S. PATENT DOCUMENTS

| 5,634,019 | A | * | 5/1997 | Koppolu et al. ............. 715/744 |
| 6,078,924 | A | * | 6/2000 | Ainsbury et al. ............ 707/101 |
| 6,167,396 | A | * | 12/2000 | Lokken ......................... 707/3 |
| 6,434,568 | B1 | * | 8/2002 | Bowman-Amuah ..... 707/103 R |
| 6,442,748 | B1 | * | 8/2002 | Bowman-Amuah ......... 717/108 |
| 6,449,659 | B1 | * | 9/2002 | Caron et al. ................. 719/315 |
| 6,473,750 | B1 | * | 10/2002 | Petculescu et al. ............. 707/3 |
| 6,493,719 | B1 | * | 12/2002 | Booth et al. ............ 707/103 X |
| 6,499,036 | B1 | * | 12/2002 | Gurevich ................ 707/103 R |
| 6,539,396 | B1 | * | 3/2003 | Bowman-Amuah ..... 707/103 R |
| 2002/0065849 | A1 | * | 5/2002 | Ferguson et al. ............. 707/513 |

* cited by examiner

Primary Examiner—Khanh B Pham
Assistant Examiner—Azam Cheema
(74) Attorney, Agent, or Firm—Merchant & Gould, P.C.

(57) ABSTRACT

Indirect persistent storage of data in a file that is associated with an application program and is capable of having an embedded OLEObject includes creating the OLEObject by way of a Component Object Model add-in that supplements the application program, and using the OLEObject to store the data in the file. The OLEObject is marked so that it is hidden from a user of the application program. After loading a file that was previously saved and closed, the OLEObject is initialized, and the stored data is retrieved. The add-in may be a reporting add-in that queries a database, such as an OLAP database.

21 Claims, 6 Drawing Sheets

INDIRECT PERSISTENT STORAGE FOR PLUGIN IN CONTAINER

BACKGROUND OF THE INVENTION

Microsoft® Excel is a spreadsheet system that enables a user to create reports for the manipulation and analysis of data. The Excel container has a number of plugin models. One such model is the Component Object Model (COM) Add-In interface, _IDTExtensibility2. Another is the OLEObject interface. Add-ins are supplemental programs that provide enhanced, optional or customized features. As one example, an appropriate add-in can effectively transform Excel into a frontend for an OLAP (on-line analytical processing) database application. By way of a reporting add-in, the Excel user can query the database server and populate Excel with data returned as the query result. The user can analyze and create reports based on this information. An Excel report of this sort is typically associated with a large quantity of meaningful data and metadata, such as information relating to the queries that have been used in the generation of the report. It is of course highly desirable for such information to be easily and conveniently saved and retrieved by the user. A user can save data in a file separate from the Excel .xls file, but it then becomes difficult to keep the two files consistent, and it cannot be guaranteed that the data will be available whenever the .xls file is available. It is preferable to save such data in the .xls file itself, and to retrieve it in the course of loading the .xls file. It is possible to save data in a hidden sheet in Excel, but the hidden sheet can be made visible and its data tampered with.

SUMMARY OF THE INVENTION

Embodiments of the present invention are related to a method and system for indirect persistent storage of data in a file that is associated with an application program and is capable of having an embedded OLEObject. The OLEObject is created by way of a Component Object Model add-in that supplements the application program, and is used to store the data in the file. The OLEObject is marked so that it is hidden from a user of the application program. After loading a file that was previously saved and closed, the OLEObject is initialized, and the stored data is retrieved. According to one aspect of the invention, the application program is a version of Microsoft® Excel and the OLEObject is an ActiveX® control. The add-in may be a reporting add-in that queries a database, such as an OLAP database.

DETAILED DESCRIPTION OF THE INVENTION

In the following detailed description together with the accompanying drawings, embodiments of the invention are described in sufficient detail to enable those having ordinary skill in the art to practice the invention. It is to be understood that other embodiments may be used, and changes may be made, without departing from the spirit or scope of the present invention. The following detailed description is, therefore, not to be taken in a limiting sense, and the scope of the present invention is defined only by the appended claims.

In general, embodiments of the present invention are related to a method and system that maintains a relationship from an add-in to an OLEObject so that an arbitrary amount of data can be stored within a container such as an Excel container or the like. According to one aspect of the invention, an implementation of _IDTExtensibility2 is used to create an OLEObject, and the OLEObject may then be used to store metadata in the Excel .xls file, in a manner described further below. Although the present invention will be described particularly with reference to embodiments associated with Excel, the Excel .xls file format, and Excel add-ins, it should be understood that the invention has broader applicability to computers running other application programs, including other spreadsheet programs and other office productivity applications, that share relevant characteristics with Excel, such as the ability to embed OLEObjects. The description provided herein does not provide extensive explanations of rudimentary concepts that are well-known to those of ordinary skill in software development relating to Microsoft® Excel and related technologies.

Figure 2:
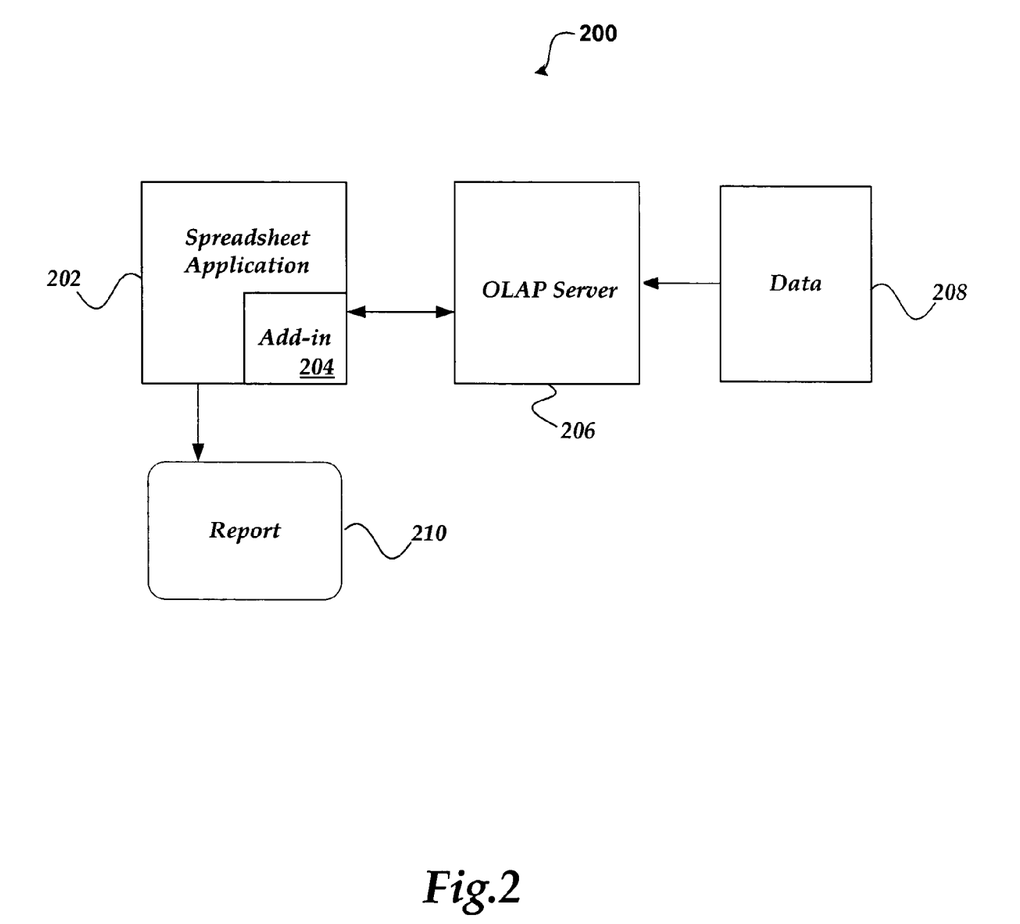
FIG. 2 is a block diagram illustrating a view of a system in which an exemplary embodiment of the present invention is situated.

Turning to FIG. 2 of the accompanying drawings, there are shown certain conceptual components of a system 200 within which one embodiment of the invention may be situated. As illustrated, the system includes a spreadsheet application 202, an add-in program 204, an OLAP server application 206, a data store 208, and a report 210. This diagram is merely meant to be illustrative of one exemplary configuration within which the present invention may be incorporated. Those having skill in the art will appreciate that the invention described herein is also susceptible to many other embodiments in which, for example, applications other than spreadsheets are used, and in which, for example, an OLAP or other database-related client-server interaction is not present.

The spreadsheet application 202 is an application program running on a computer, such as Microsoft® Excel or the like, that enables a user to create reports based on data that is entered, imported, or queried. As depicted in FIG. 2, the spreadsheet application 202 is enhanced by an add-in program 204, which may be structured as a plugin to the spreadsheet application 202. The spreadsheet application 202 together with the add-in 204 function as an OLAP frontend, interacting with the OLAP server 206 by issuing queries to the server 206 requesting information from a data cube that has been constructed by the server 206 based on the data store 208. The OLAP server 206 may be incorporated within a product such as Microsoft® SQL Server, and may reside on the same computer or a second computer. Based on the results of queries returned by the OLAP server 206, an end user of the spreadsheet application 202 can analyze data and create reports, such as the depicted report 210.

Figure 3:
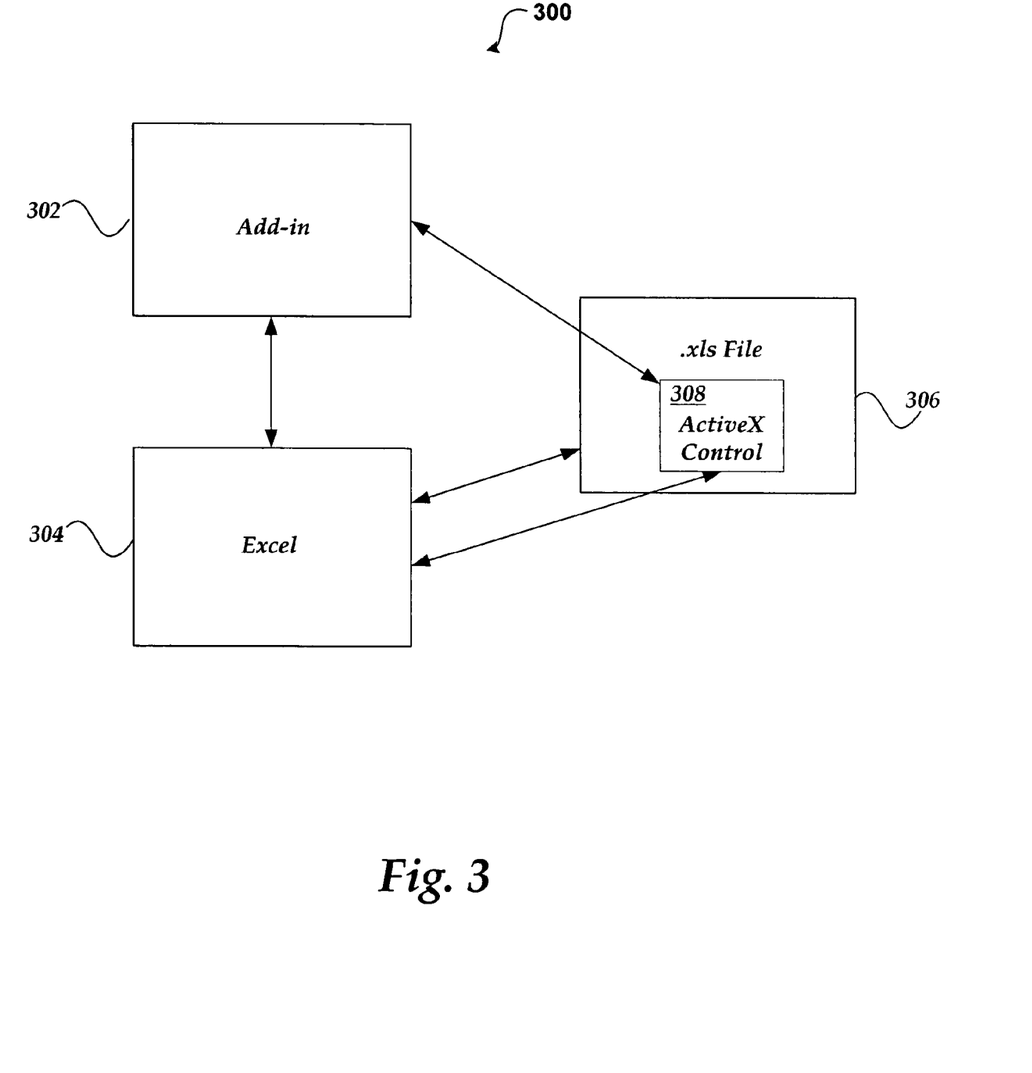
FIG. 3 is a block diagram illustrating the relationship among certain components of a system within which an embodiment of the present invention may be incorporated.

Turning to FIG. 3, there is illustrated the relationship among certain components of a system within which an embodiment of the present invention may be incorporated. The Excel executable program 304 is supplemented by an add-in program 302, as described above. Data is stored persistently in the .xls file 306, within which is embedded an ActiveX® control 308 in which metadata or other data is stored in accordance with the invention. For example, when Excel 304 saves information to the .xls file 306, the add-in 302 is notified, and the add-in 302 stores metadata with the ActiveX® control 308. Subsequently, when a closed .xls file 306 is opened for reading by Excel 304, Excel 304 recognizes that the xls file 306 has an ActiveX® control 308, and the add-in 302 is informed that the .xls file 306 has been opened. The add-in 302, communicating with the ActiveX® control 308, retrieves the stored information.

Figure 4:
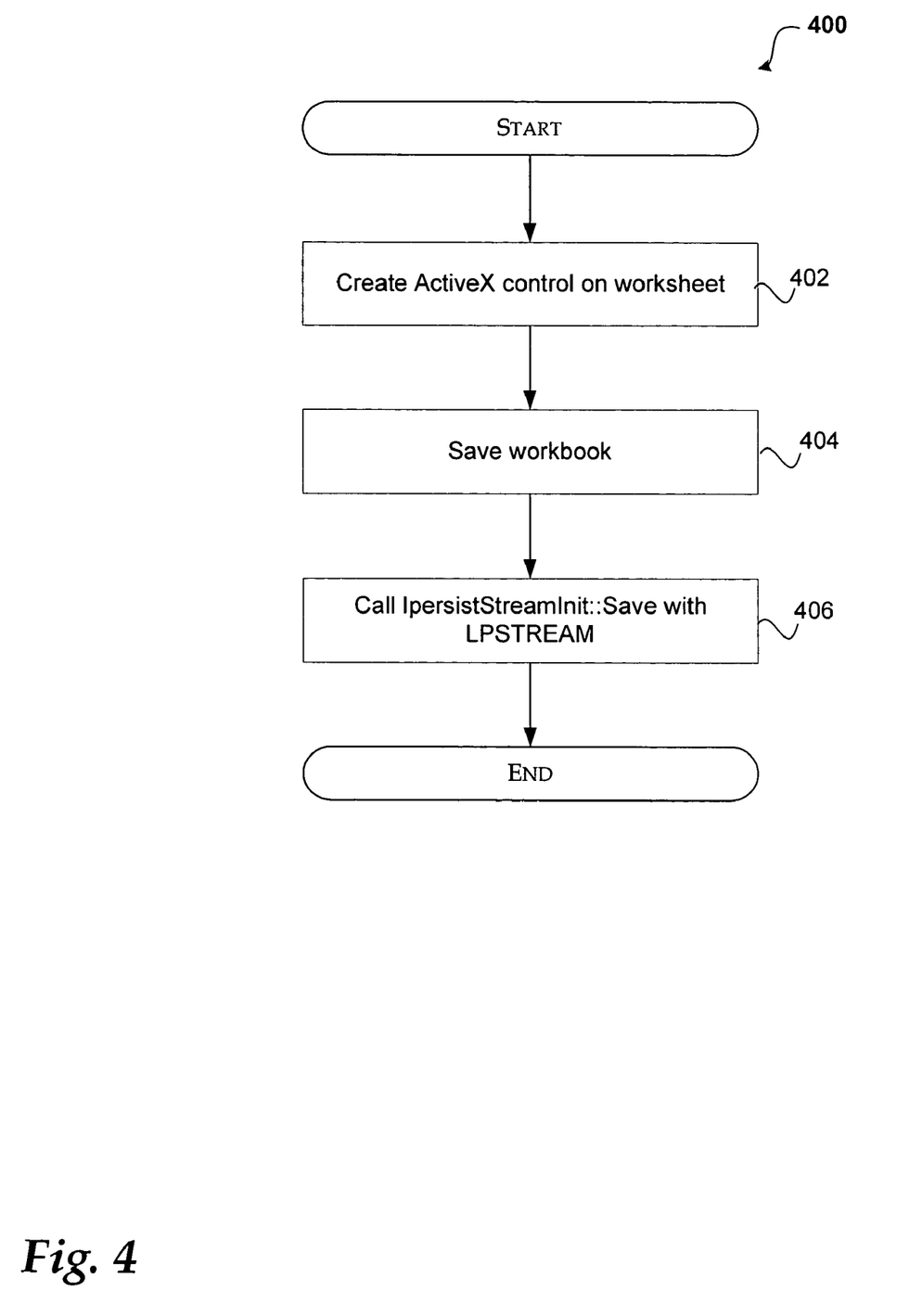
FIG. 4 is a flow diagram illustrating a process for persistent storage of metadata in an Excel container, in accordance with an embodiment of the invention.

FIG. 4 provides a flow diagram 400 that illustrates a process for persistent storage of data or metadata in an Excel container or the like, in accordance with aspects of one embodiment of the present invention. At step 402 Excel creates an ActiveX® control at position (−20, −20). This position represents the initial coordinates of the object, in points, relative to the upper-left corner of cell A1 in a worksheet. In accordance with the invention, it is ensured that no more than one such hidden control is created per worksheet. At step 404 the Excel user causes Excel to save the workbook associated with the worksheet. At step 406, Excel calls the method IpersistStreamInit::Save and provides an LPSTREAM parameter. This stream is used to save information as desired.

Figure 5:
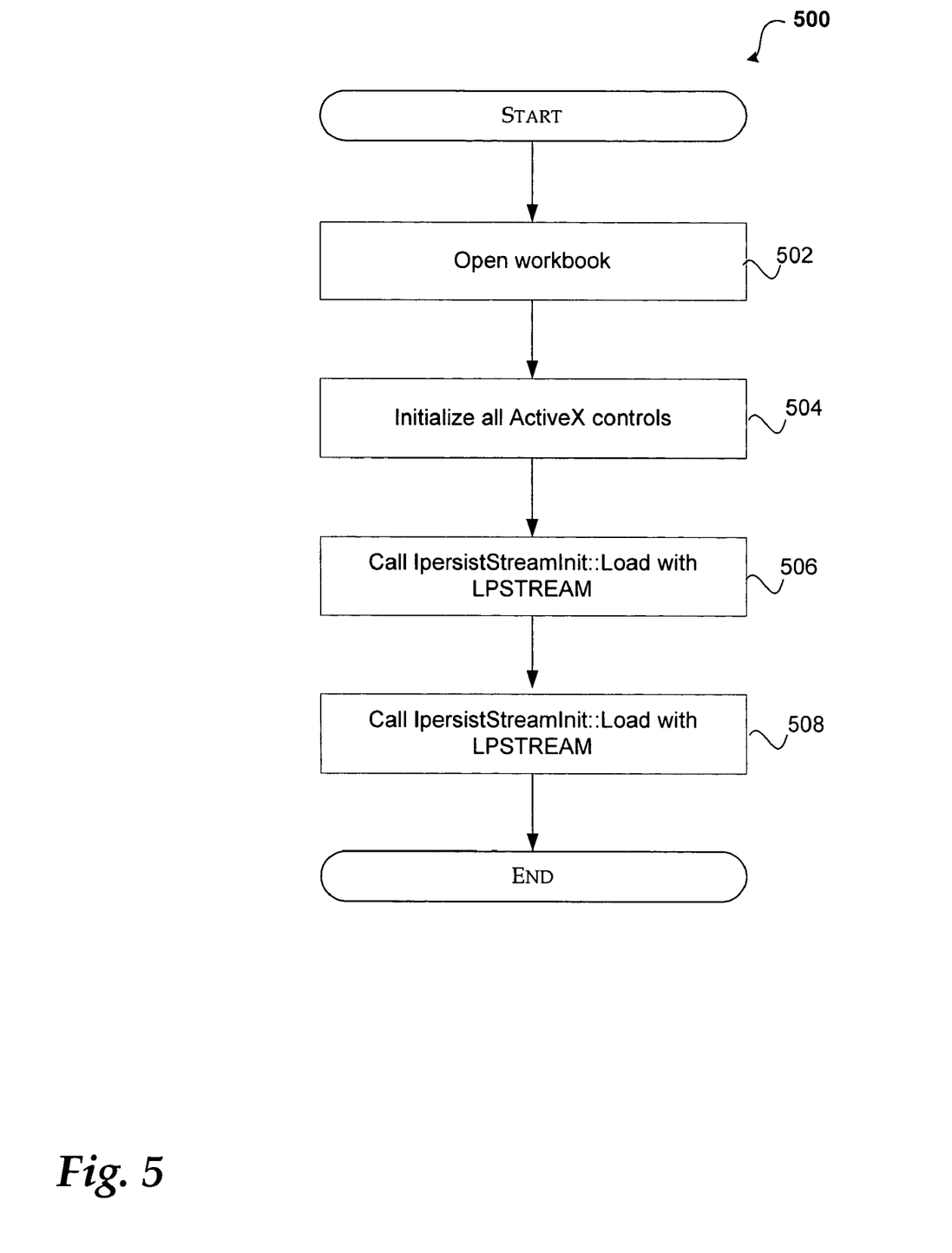
FIG. 5 is a flow diagram illustrating a process associated with loading metadata stored in accordance with an embodiment of the invention.

FIG. 5 provides a flow diagram 500 that illustrates a process associated with loading metadata stored in accordance with an embodiment of the invention. At step 502 the user causes Excel to open a workbook. At step 504 Excel initializes ActiveX® controls associated with the workbook, including the ActiveX® control that was previously created as illustrated in FIG. 4. At step 506 Excel calls the IpersistStreamInit::Load method for the ActiveX® control associated with the data that was persisted in the .xls file, passing it the LPSTREAM parameter pointing to the stream from which the object should be loaded. At step 508 the newly-created object reads the stored data into memory.

Figure 6:
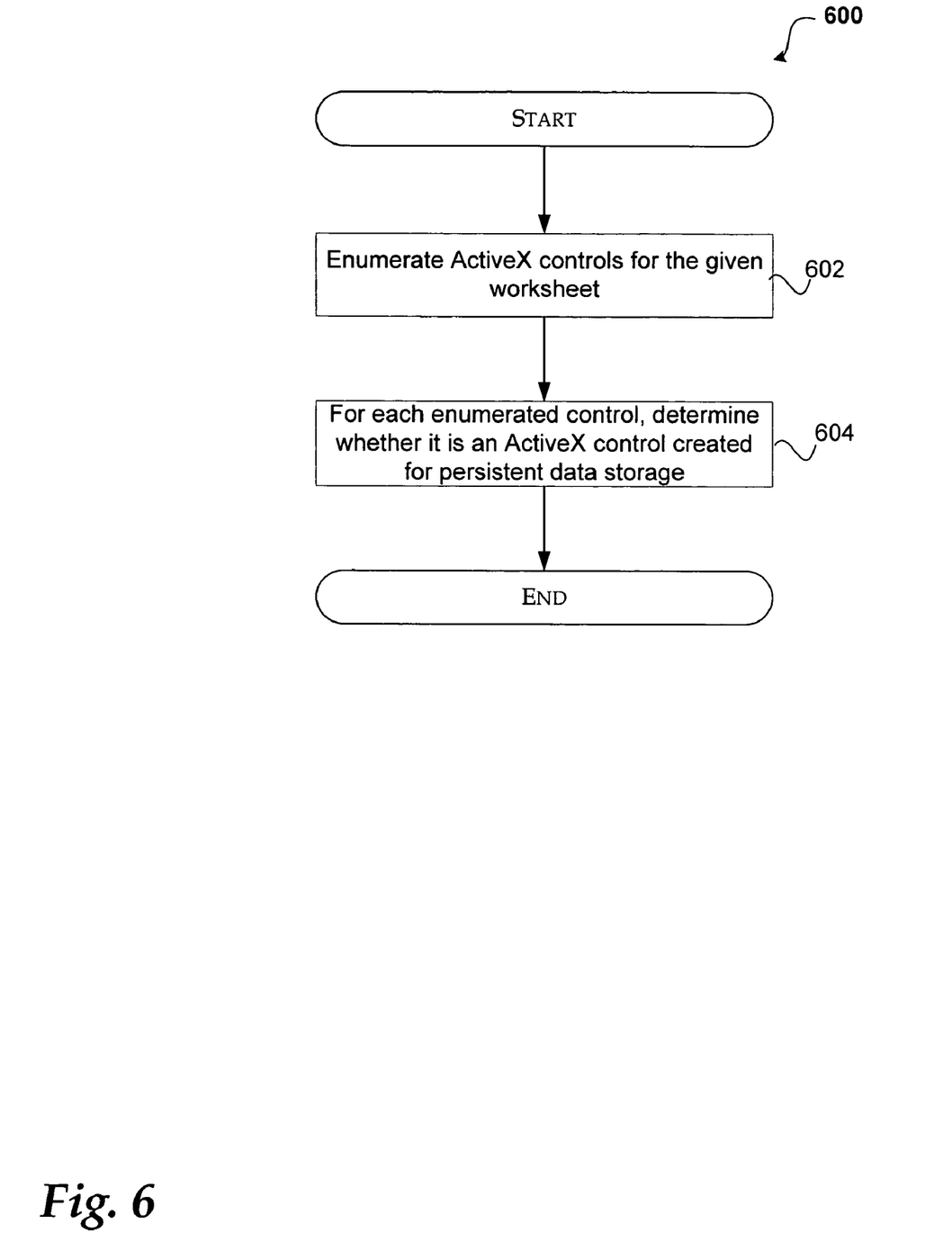
FIG. 6 is a flow diagram illustrating steps associated with accessing per-sheet information in accordance with an embodiment of the invention.

FIG. 6 provides a flow diagram 600 that illustrates certain steps associated with accessing per-sheet data in accordance with an embodiment of the present invention. At step 602, with respect to the worksheet under consideration, all ActiveX® controls on the worksheet are enumerated, including the hidden one that was created in accordance with the methods described above. At step 604, for each control being enumerated, it is determined whether the control is an ActiveX® control created for data storage in accordance with the present invention. In this way, the per-sheet data associated with the ActiveX® control is located.

The per-sheet data may be used, for example, in the following way. Multiple reports are associated with each sheet. Information about the sheets is stored in a LayoutStructs class. When a new report is created, it is necessary to obtain a LayoutStructs object for the sheet. The ActiveX® control on the sheet, created in accordance with the invention, is located, and the method GetLayoutStructs( ) is called on the control object. The ActiveX® control takes the pointer to its LayoutStructs object and casts it to a BYTE* pointer and returns it. The calling code casts it back to a LayoutStructs pointer and uses it.

The present invention provides for storage of data in any form, including binary data as well as non-binary data, and of any size. Excel saves the LPSTREAM data inside the .xls file itself, so that worksheet information is always available, unlike schemes in which data is stored separately from the .xls file.

ILLUSTRATIVE OPERATING ENVIRONMENT

Figure 1:
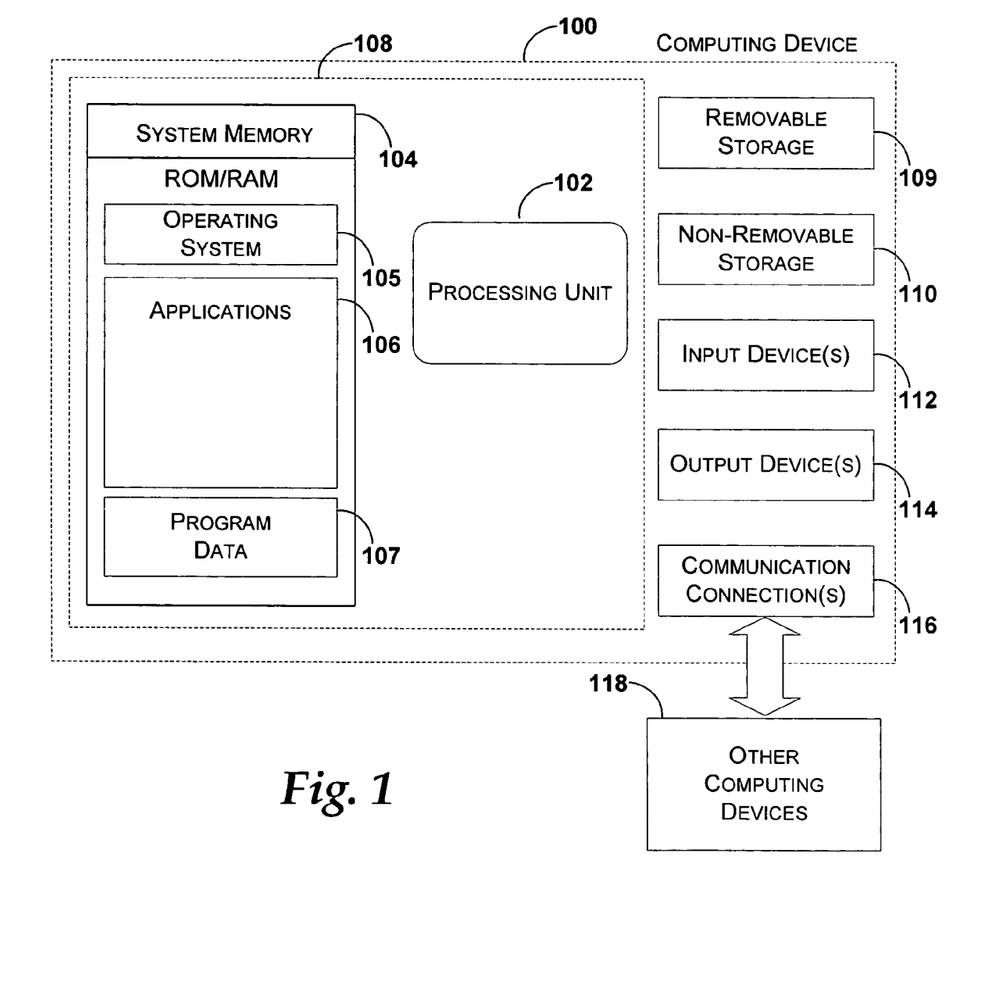
FIG. 1 is an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Applications 106 may include, for example, office productivity applications such as Microsoft® Excel and other Microsoft® Office applications. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification provides a complete description of the manufacture and use of the composition of the invention. Since many embodiments of the invention can be made without departing from the spirit and scope of the invention, the invention resides in the claims hereinafter appended.

What is claimed is:

1. A method for indirect persistent storage of data in a file, wherein the file is associated with an application program and is capable of having an embedded Object Linking and Embedding Object (OLEObject), the method comprising:
   determining when the application program on a first computing device saves information to the file;
   associating a Component Object Model add-in application program with the application program; wherein the Component Object Model add-in supplements the application program on the first computing device such that the application program functions as a front end to an OLAP server that is a different computing device from the first computing device;
   creating the OLEObject by way of the Component Object Model add-in; wherein the OLEObject is hidden from view of a user and is embedded within the file;
   issuing a query from the Component Object Model add-in to the OLAP server; wherein the query requests information from the OLAP server;
   the application program notifying the Component Object Model add-in when the application program saves the information to the file; and
   in response to the application program notifying the Component Object Model add-in, the Component Object Model add-in application program storing data with the OLEObject in response to the application program saving the information to the file; wherein the stored data is related to the operation of the Component Object Model add-in.

2. The method of claim 1, further comprising marking the OLEObject so that it is hidden from a user of the application program.

3. The method of claim 1, further comprising, after loading the file:
   initializing the OLEObject; and
   retrieving the stored data.

4. The method of claim 1, wherein the application program is a spreadsheet application.

5. The method of claim 1, further comprising calling an IpersistStreamInit::Save method.

6. The method of claim 3, further comprising calling an IpersistStreamInit::Load method.

7. The method of claim 1, further comprising accessing the data by enumerating a set of controls.

8. A system for indirect persistent storage of data in a file, wherein the file is associated with an application program and is capable of having an embedded Object Linking and Embedding Object (OLEObject), comprising:
   a processor and a computer-readable storage medium;
   an operating environment stored on the computer-readable medium and executing on the processor; and
   an application operating under the control of the operating environment that is configured to execute instructions, comprising:
      creating the OLEObject by way of a Component Object Model add-in application that supplements the application program such that the application program functions as a front end to an OLAP server that is a different computing device from the computing device including the application; wherein the OLEObject is embedded within the file and is hidden from view of a user of the application;
      issuing a query from the Component Object Model add-in application to the OLAP server; wherein the query requests information from the OLAP server;
      notifying the add-in when the application saves information to the file;
      in response to the notification, the add-in storing data in the file within the OLEObject in response to the application saving the information to the file; wherein the stored data is related to the operation of the add-in to enable the application program to issue queries to the OLAP server in response to the data stored in the file using the OLEObject; wherein data is stored in the file and data is stored in the OLEObject'; wherein the data stored in the OLEObject is metadata.

9. The system of claim 8, wherein the OLEObject is a control.

10. The system of claim 8, wherein the application program is a spreadsheet program.

11. The system of claim 8, wherein the file is an .xls file.

12. The system of claim 8, further comprising a database that is queried by way of the add-in.

13. The system of claim 12, wherein the database is an OLAP database.

14. The system of claim 12, wherein the stored data is metadata associated with an issued query; and wherein data associated with the file is retrieved from the control.

15. A tangible computer-readable storage medium having computer-executable instructions for indirect persistent storage of data in a file, wherein the file is associated with an application program and is capable of having an embedded Object Linking and Embedding Object (OLEObject), the instructions comprising:
   creating the OLEObject by way of a Component Object Model add-in application that includes functionality that supplements the application program such that the application program functions as a front end to an OLAP server that is a different computing device from the computing device including the application; wherein only one OLEObject is embedded within the file for persistent storage of the data in the file; wherein the OLEObject is hidden from view of a user;
   the application program notifying the add-in when the application saves information to the file;
   issuing a query from the Component Object Model add-in application to the OLAP server; wherein the query requests information from the OLAP server;
   in response to the application program notifying the Component Object Model add-in, the add-in storing data with the OLEObject in response to the application saving the information to the file and notifying the add-in; wherein the stored data is related to the operation of the add-in.

16. The computer-readable medium of claim 15, further comprising marking the OLEObject so that it is hidden from a user of the application program.

17. The computer-readable medium of claim 15, further comprising, after loading the file:
   initializing the OLEObject; and
   retrieving the stored data.

18. The computer-readable medium of claim 15, wherein the application program is a spreadsheet application.

19. The computer-readable medium of claim 15, further comprising calling an IpersistStreamInit::Save method.

20. The computer-readable medium of claim 18, further comprising calling an IpersistStreamInit::Load method.

21. The computer-readable medium of claim 15, further comprising accessing the data by enumerating a set of controls; wherein enumerating the set of controls includes determining which one of the controls is created for data storage.

* * * * *

UNITED STATES PATENT AND TRADEMARK OFFICE
CERTIFICATE OF CORRECTION

| | | |
|---|---|---|
| PATENT NO. | : 7,653,637 B2 | Page 1 of 1 |
| APPLICATION NO. | : 10/970791 | |
| DATED | : January 26, 2010 | |
| INVENTOR(S) | : Lakshmi Narayanan Thanu et al. | |

It is certified that error appears in the above-identified patent and that said Letters Patent is hereby corrected as shown below:

In column 6, line 10, in Claim 8, delete "OLEObject';" and insert -- OLEObject; --, therefor.

In column 6, line 60, in Claim 20, delete "claim 18," and insert -- claim 17, --, therefor.

Signed and Sealed this
Twenty-fifth Day of January, 2011

David J. Kappos
*Director of the United States Patent and Trademark Office*